Sept. 15, 1936.  F. E. STAATS  2,054,207
HYDRAULIC TRANSMISSION
Filed April 25, 1934  4 Sheets-Sheet 2
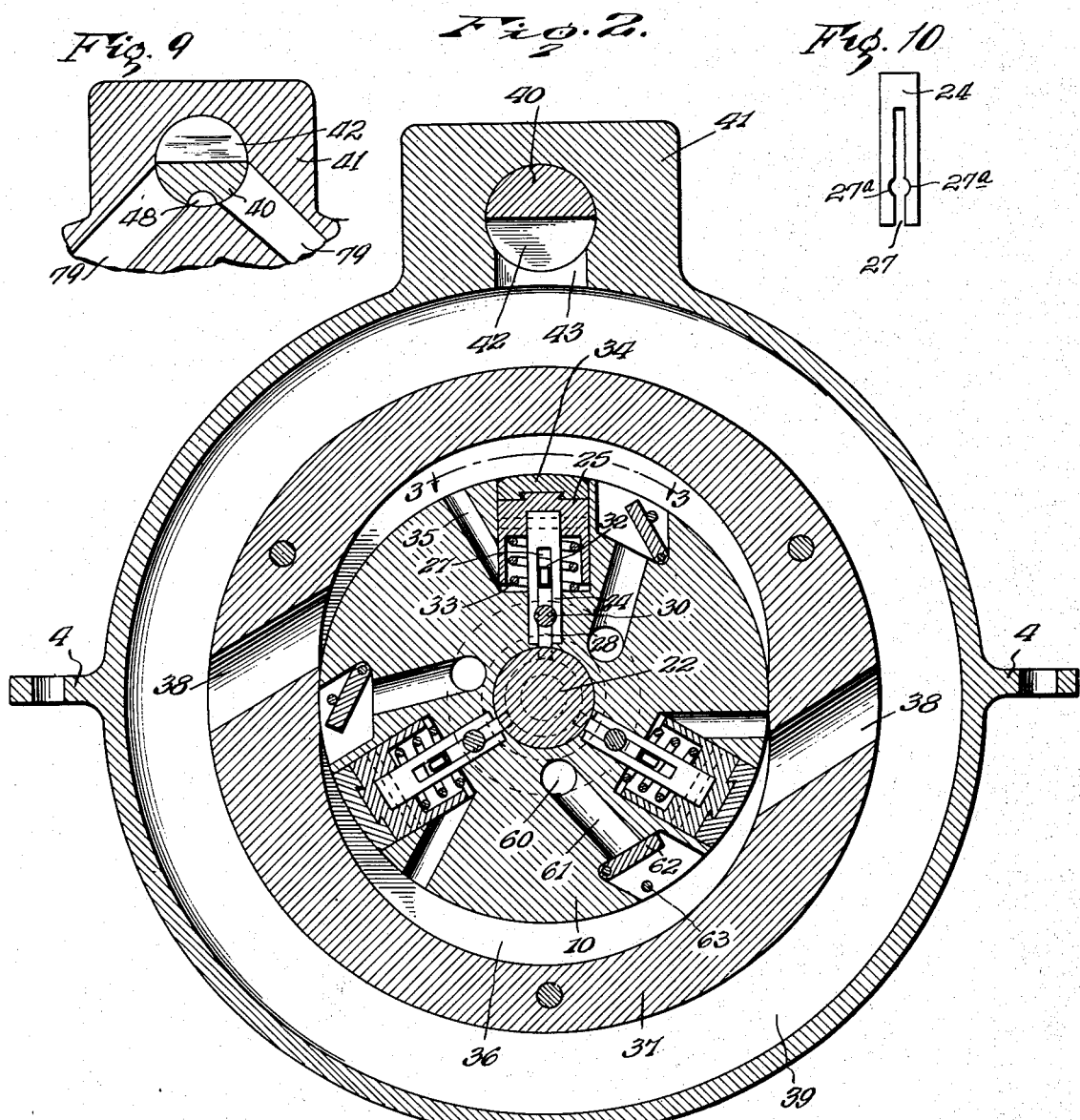
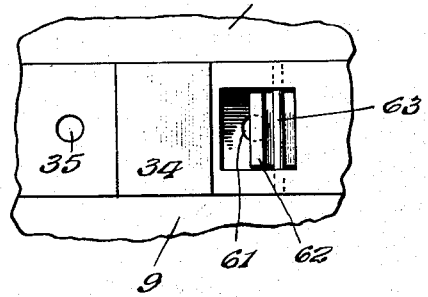
Inventor
F. E. Staats.
By Lacey & Lacey, Attorneys

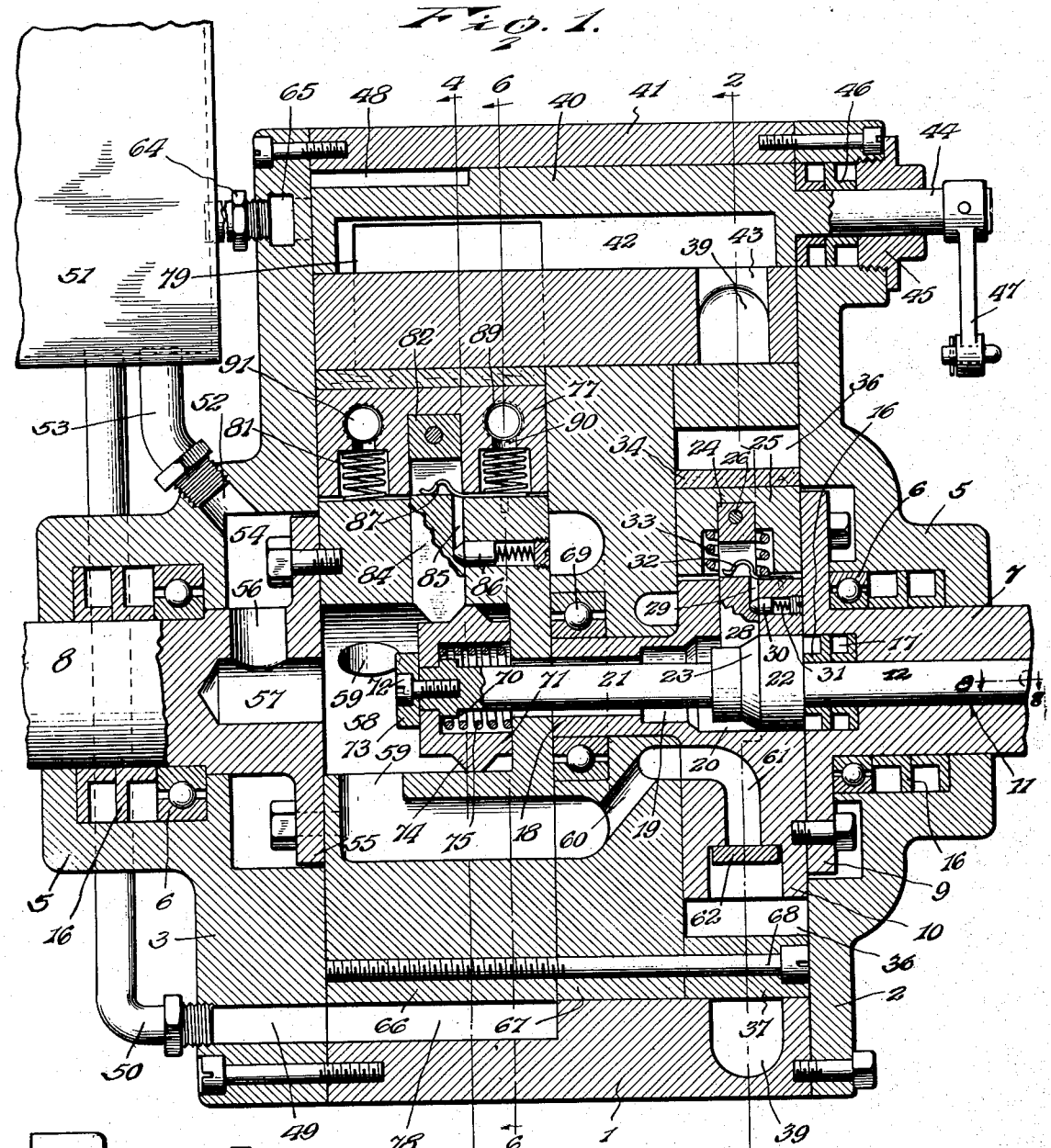

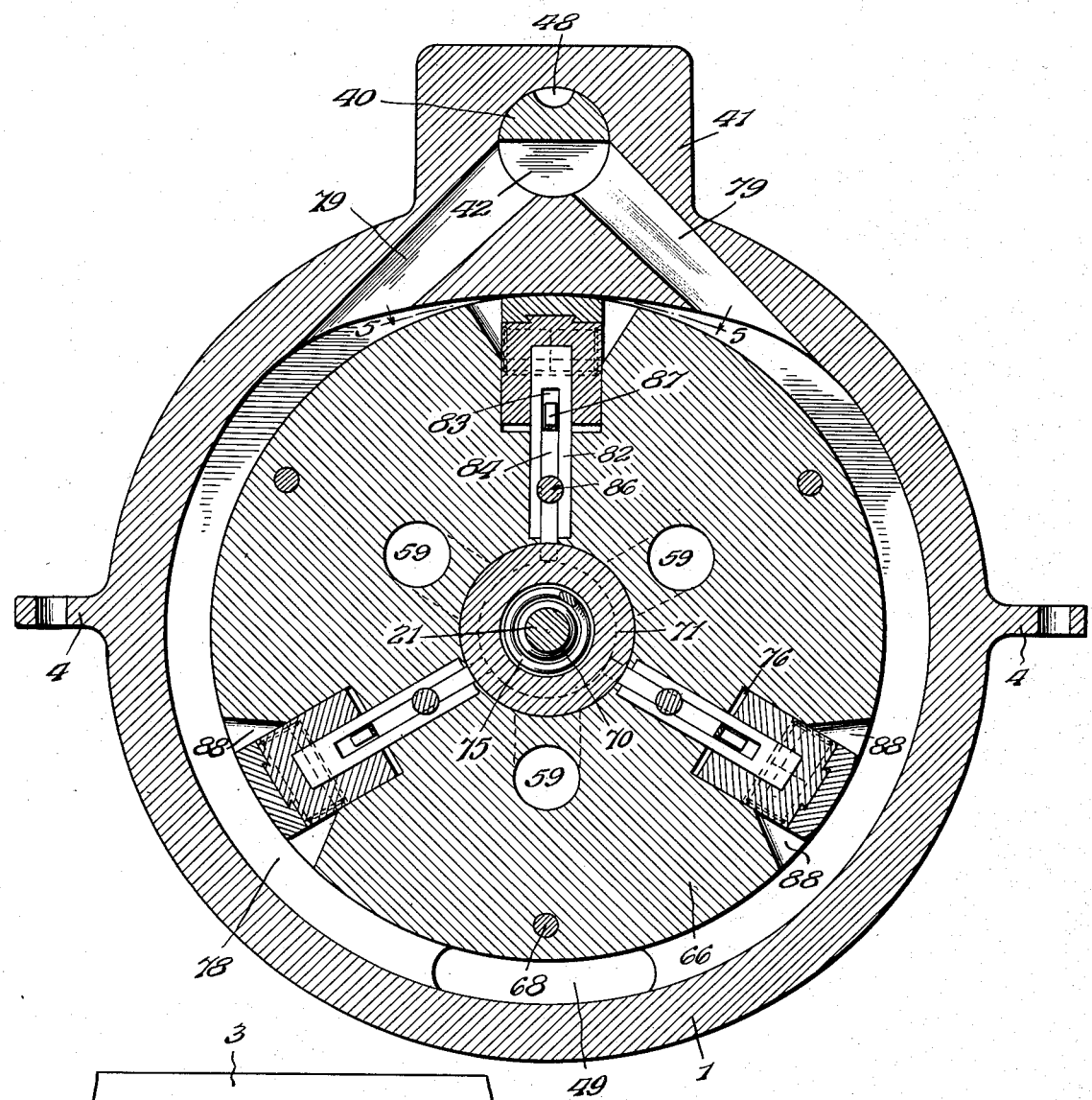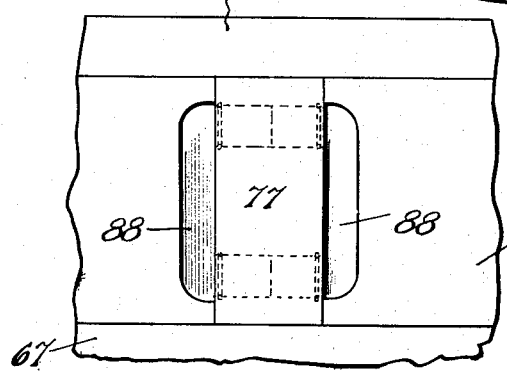

Sept. 15, 1936.  F. E. STAATS  2,054,207
HYDRAULIC TRANSMISSION
Filed April 25, 1934   4 Sheets-Sheet 4
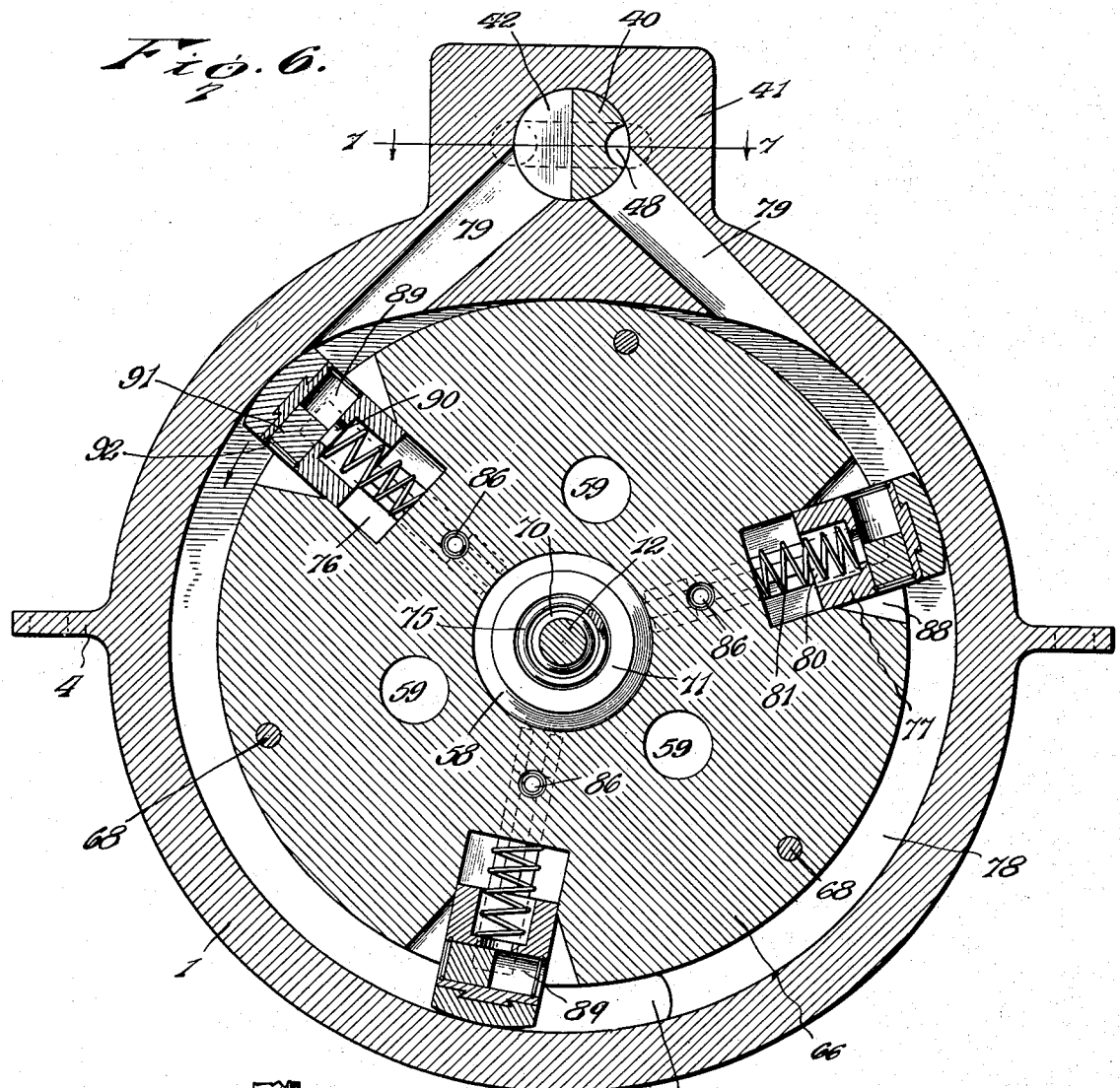
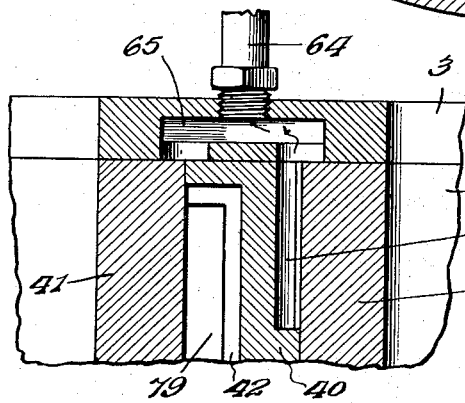
Inventor
F. E. Staats.
By Lacey & Lacey,
Attorneys Patented Sept. 15, 1936

2,054,207

UNITED STATES PATENT OFFICE 2,054,207

HYDRAULIC TRANSMISSION

Franklin E. Staats, Peoria, Ill., assignor to Staats Hydraulic Appliance, Inc., Peoria, Ill., a corporation of Illinois Application April 25, 1934, Serial No. 722,380

4 Claims. (Cl. 60—53)

This invention relates to hydraulic transmissions and has for its object the provision of a compact and efficient mechanism whereby the power of a driver may be transmitted through a liquid medium to a driven element to impart rotation thereto. The invention provides novel means for controlling the action of the primary and secondary rotors and means for controlling a circulation of the transmitting fluid, and also provides a novel construction and arrangement of the several parts whereby damage to the working elements will be guarded against and the durability of the mechanism will be increased. The invention is illustrated in the accompanying drawings and will be hereinafter fully described, the novel features being particularly defined in the appended claims.

In the drawings:

Figure 1 is a longitudinal section through a transmission mechanism embodying the present invention.

Figure 2 is a section through the primary rotor on the line 2—2 of Figure 1 with the valve in position to render the transmission neutral.

Figure 3 is a detail plan view of a portion of the primary rotor, the viewpoint being indicated by the line 3—3 in Figure 2.

Figure 4 is a section through the secondary rotor on the line 4—4 of Figure 1 with the valve in the neutral position to prevent rotation of the secondary rotor.

Figure 5 is a detail view of a portion of the secondary rotor, as seen from the line 5—5 in Figure 4.

Figure 6 is a section on the line 6—6 of Figure 1 with the valve turned 90 degrees from its position in Figure 4 into position to cause rotation of the secondary rotor towards the left in this figure, turning of the valve 180 degrees from the position shown in this figure serving to cause rotation of the secondary rotor towards the right.

Figure 7 is a detail section on the line 7—7 of Figure 6.

Figure 8 is a detail section taken longitudinally of the driving shaft.

Figure 9 is a detail section.

Figure 10 is a detail elevation of a plunger stem.

Referring more particularly to the drawings, the numeral 1 indicates a cylindrical casing having its ends closed by end plates 2 and 3, respectively, and provided at diametrically opposite points with lugs 4 through which securing bolts may be inserted into a rigid support to secure the casing thereto. The end plates 2 and 3 are provided on their outer sides with offsets or bosses 5 within which bearings 6 are mounted to journal the driving shaft 7 and the driven shaft 8. The driving shaft 7 is provided with an annular flange 9 which is bolted or otherwise rigidly secured to the primary rotor 10 and is also provided with a central bore or socket 11 to receive a slidable stem 12 of a controlling member, which will be more fully described later. A diametrical slot 13 is formed in the shaft 7 and intersects the socket or bore 11, as shown clearly in Figure 8, a pin 14 being inserted through the end of the stem 12 and playing in said slot longitudinally of the shaft and having its ends fitted loosely in an annular groove in a ring or collar 15 which is slidably fitted upon the shaft, as will be understood. The ring 15 is provided with studs or trunnions which may be engaged by a fork or yoke on the lower end of a hand lever or foot pedal so that the controlling element may be manipulated by the operator to control the action of the transmission. Liquid seals, indicated at 16, are provided within the offsets 5 and around the inner portion of the stem 12 within a socket 17 formed in the inner end of the shaft 7. as clearly shown in Figure 1, so that leakage will be avoided.

The primary rotor 10 is bolted at one side to the flange 9 on the driving shaft, as has been stated, and on its opposite side, it is provided with a hub 18 which fits rotatably within a central opening provided therefor in the secondary rotor, the bore of said hub being enlarged at the end nearer the driving shaft, as shown at 19 and 20, whereby to accommodate an extension 21 of the stem 12, and a head 22 formed on or rigidly secured upon the stem. The head 22 is of greater diameter at its outer end than at its inner end and between the two ends has a beveled portion 23. The body of the rotor 10 is provided with radial passages or slots, as will be understood upon reference to Figure 2, within which are slidably fitted stems 24 each of which forms a part of or is firmly secured in a plunger 25 which is slidably mounted within a cylinder provided therefor in the rotor, as will be understood. The slidable stem 24 has its radially outer end secured in the plunger, as by a pin 26, and its inner end formed with a longitudinal open-ended slot or notch 27 in which is slidably mounted a trigger 28 which bears upon the head 22 and has its inner end portion properly shaped to conform to the bevel 23 of the head, as shown in Figure 1. This trigger has its edge, presented to the driving shaft, reduced, as shown at 29, to receive the end of a detent 30 slidably mounted in the wall of the rotor and yieldably held to the trigger by a spring 31, as will be understood upon reference to Figure 1. The lower end of this reduced edge of the trigger is beveled and the end of the detent is correspondingly beveled so that, if the head 22 be pushed inwardly, the trigger will be pushed radially outward and the detent will be moved longitudinally into its socket, the plunger being thereby released. It will be noted, upon reference to Figure 2, that the detent is of such diameter that it will project slightly beyond the sides of the trigger and will engage in notches 27a provided therefor in the opposed walls of the slot 27 in the stem 24 to hold the stem and plunger in retracted position. When the detent is in released position, it is held in such position by bearing against the edge of the trigger below the reduced portion thereof. The trigger 28 is held to the head 22 by a spring 32 which is secured at one end in the lower end of the cylinder provided for the plunger 25 and has its opposite free end bearing upon the trigger, as clearly shown in Figure 1, the spring extending into the upper portion of the slot or notch 27 in the stem 24. As will be understood upon reference to Figure 2, an expansion spring 33 is provided around the stem 24 and has its opposite ends bearing upon the bottom wall of the cylinder which houses the plunger and its opposite end bearing against the plunger, as shown. The plunger is illustrated as provided with a removable cap or end piece 34, but it will be understood that this cap or end piece may be omitted and the plunger made of such length that in retracted position its outer end will be flush with the circumference of the rotor. The removable cap, however, provides a ready means for compensating for wear without requiring the provision of an entire new plunger. When the plunger is released it is projected beyond the circumference of the rotor by the action of the spring 33, and a passage 35 is formed in the rotor to admit oil to the cylinder at the inner end of the plunger so that the plunger will be held by the hydraulic pressure in its projected position. The primary rotor 10 is disposed within a chamber 36 defined by a flange 37 on the side of the secondary rotor and this chamber is so shaped that its inner surface is eccentric to the rotor, as shown in Figure 2, thereby defining cam recesses or chambers above and below the rotor in which the plungers will work. The space 36 communicates through passages 38 in the flange 37 with an annular groove 39 in the inner circumference of the casing 1. This groove 39, as well as the passages 38 and the chambers 36, is filled with a non-compressible fluid, preferably oil, so that, if no escape for the fluid be provided, the projected plungers 25 will be locked to the eccentric flange 37 by the fluid and, consequently, the rotation of the rotor will be communicated to the flange 37 to drive the secondary rotor. If there be an outlet provided for the oil, the rotation of the rotor will pump the oil out of the groove or channel 39 into a corresponding chamber surrounding the secondary rotor and will thereby impart rotation to the secondary rotor through the force of the oil driven against it. The outflow or circulation of the fluid is controlled by a valve 40 which is mounted in an offset 41 provided upon the casing I and extending longitudinally of the casing. The valve is in the form of a bar or rod of circular cross section having a semi-cylindrical recess 42 formed in one side and terminating short of the ends of the bar or rod, as shown in Figure 1, this recess communicating at one end with the annular chamber or groove 39 through a short port 43 formed in the offset 41, as will be understood upon reference to Figures 1 and 2. The valve is provided at one end with a trunnion 44 journaled in a bearing plug or cap 45 provided therefor in the end plate 2 of the casing and sealed by liquid seals 46 of well-known form. A crank 47 is secured upon the outer end of the trunnion 44 to be connected with a hand lever or pedal so that the valve may be adjusted as desired. At its end opposite the trunnion 44, the valve 40 is provided with a longitudinal groove or recess 48 which extends a relatively short distance along the side of the valve, as shown in Figures 1 and 7. The purpose of this groove will presently appear.

The end plate 3 of the casing is provided at a low point with a port or passage 49 in the outer end of which is secured a pipe 50 leading to a supply tank 51 disposed adjacent the upper portion of the casing and intended to contain a body of oil or other non-compressible fluid so that the fluid, after circulating through the transmission mechanism, may be driven into the tank from which the air, which may be gathered by the oil in its circulation, as always occurs to some extent, will be vented, it being understood, of course, that the tank is provided with a convenient air vent in its upper portion. The provision of this tank also provides an opportunity for the oil to be relieved of the high temperature which it acquires during circulation through the mechanism so that there will always be cooled air-free oil within the apparatus. The apparatus is filled through an inlet port 52 which is provided in the end wall 3 above the center of the same and preferably within the offset bearing element 5, said port being connected to the bottom of the tank through a pipe 53, as shown in Figure 1. The port 52 opens directly into an annular space or chamber 54 formed in the end wall 3 and accommodating an annular flange 55 on the driven shaft 8 which is secured to a side of the secondary rotor. A radial port 56 in the driven shaft leads to a central bore or port 57 in the shaft and the port 57 opens directly into a central chamber 58 in the secondary rotor from which ports 59 lead inwardly to the passages 60, as shown in Figure 1. The passages 60, in turn, communicate with the passages 61 formed in the primary rotor and discharging through the periphery of the latter into the cam chamber or space 36. It will be noted that the passages 61 extend from the inner side near the hub of the primary rotor and then turn to pass radially to the periphery of the rotor and at the periphery they are enlarged to accommodate flap valves 62 which open outwardly and have their opening movement limited by stop pins 63 disposed across the respective outlets of the ports. These valves are check valves which will permit the oil to flow into the space or chamber 36 but will prevent the flowing therefrom in a retrograde direction so that the desired circulation of the fluid will be effected. There is also a port in the side of the end plate 3 at the top of the same which is connected by a pipe 64 with the tank 51 and this port forms an outlet from a recess 65 within the end plate and having its opposite ends open to the valve 40, as will be understood upon reference to Figure 7. When the valve 40 is in the position shown in Figures 1, 2 and 4, a circulation of the fluid will be permitted and if the valve be set, as shown in Figures 6 and 7, free circulation of the fluid will be cut off, but the fluid may be vented through the groove 48 and the recess 65 to the tank.

The secondary rotor is shown as formed of three members, an end member 66, a central member 67 and the eccentric flange 37, these parts being secured together by bolts 68, but this construction is merely a matter of convenience in machining the parts, and it will be understood that the rotor might be a single integral structure without involving any departure from the invention. The central member 67 has a central opening accommodating the hub 18 of the primary rotor and anti-friction bearings 69 are fitted about the hub within said opening. The extension 21 of the stem 12 projects through the hub 18, as clearly shown in Figure 1, and has its extremity disposed within the chamber 58 of the secondary rotor. Adjacent its extremity, the extension is provided with an annular flange 70 and an annular head 71 is fitted upon the end of the stem in abutting relation to said flange, as clearly shown. This head is sufficiently loose upon the stem to permit relative rotation, but is held against separation from the stem by a washer 73 through which a cap screw 72 is inserted to be secured in the end of the stem, as shown. The head 71 is provided between its ends with an annular rib 74 which is beveled on both sides, and an expansion spring 75 is housed within the head and bears at one end against the end wall of the chamber 58 and at its opposite end against the head so that the return stroke of the head will be cushioned. It should be understood that when the transmission is to be set in operation, the stem 12 and its associated parts are pushed inwardly through the action of a hand lever or a foot pedal, and when the pressure upon the foot pedal or the lever is released, a spring connected therewith will return the parts to the position shown in Figure 1 of the drawings. The secondary rotor member 66 is formed with radial cylinders or sockets 76 in each of which is slidably mounted a plunger 77, it being noted that the longitudinal extent of said plunger is greater than the corresponding dimension of the plungers 25. These plungers 77 are adapted to be projected into the space or chamber 78 formed in the wall of the casing by and between the inner circumference of the casing and the rotor, as shown in Figures 4 and 6, said space 78 communicating directly with the port 49 at the lower end of the end plate 3. In the upper portion of the casing, divergent passages 79 lead from the valve 40 to the space or chamber 78, as shown in Figures 4 and 6, communicating with said chamber 78 at opposite sides of the vertical diameter of the secondary rotor, it being noted, upon reference to Figures 4 and 6, that the secondary rotor at the upper end of the vertical diameter is close to the wall of the chamber 78 so that the plunger presented to said wall will be retracted. It will also be noted that the annular wall of the chamber 78 is flattened at its upper portion so as to produce an eccentric relation of the casing to the secondary rotor. The plungers 77 are provided in their inner edges with pairs of sockets 80 receiving the outer ends of expansion springs 81 which have their inner ends bearing against the end walls of the cylinders or chambers 76, and secured in or formed integral with the plungers, centrally of the same, are stems 82 corresponding to the stems 24 mounted in the primary rotor. These stems 82 are formed with longitudinal notches or open ended slots 83 receiving triggers 84 which have their inner ends bearing upon the head 71 and beveled at both corners, as clearly shown in Figure 1. The upper ends of the triggers 84 are reduced, as shown at 85, to accommodate the ends of detents 86 which correspond to the detents 30, previously described, while springs 87 bear upon the outer ends of the triggers to hold them yieldably in contact with the head 71, as shown and as will be understood. The outer end portions of the several cylinders or chambers 76 are flared, as shown at 88, to admit fluid to the inner ends of the plungers so as to hold them in projected position. The fluid will enter the flared end of the cylinder 76 at one side or the other, accordingly as the rotor is moving forwardly or in reverse, and from the cylinder, the fluid will enter a transverse passage 89 through the plunger near the outer end of the same, as shown in Figure 6, an opening 90 in the plunger providing communication through the inner end thereof between said transverse passage 89 and the inner end of the cylinder. A slidable valve 91 is mounted in the passage 89 and will be shifted toward either end of the passage by the impact of the fluid according to the direction in which the fluid enters. Stop rings 92 are fitted in the ends of the passage 89 so as to prevent ejection and loss of the valve. When the parts are at rest, they are in the positions shown in Figures 1, 2 and 4, the plungers of the secondary rotor being in neutral, and it may be noted, at this point, that the position of the valve 40 controls the direction of movement of the rotor and letters or other indices may be provided on the casing adjacent the crank 41 to facilitate the setting of the valve according to a well-known practice. When the apparatus is to operate, the stem 12 is pushed inwardly and the beveled surface 23 and the beveled rib 74 will, consequently be caused to ride under and act upon the respective triggers 28 and 84 to project the latter radially outward, the beveled formation of the ends of the detents 30 and 86 permitting the detents to yield and permit the outward movement. The detents, of course, will be released from the stems 24 and 82 simultaneously with their release from the several triggers and the plungers will, consequently, be projected radially outward under the influence of the springs bearing respectively thereon. The engine may be then started, and as the primary rotor is secured directly to the driving shaft 7 which, it will be understood, is the engine shaft or operatively connected with the engine shaft, said rotor will be at once set in motion. The valve 40 being set as shown in Figures 1, 2 and 4, which is the neutral position, the oil or other fluid will be driven through the respective passages 38 into the annular chamber 39 and then through the recess 42 of the valve to the passages 79 and thence into and through the passage 78 to the port 49, the pipe 50 and the tank. The return flow is from the tank through the pipe 53 and the passages 56, 57, 60 and 61 to the chambers 36. If the valve be set in the position shown in Figure 6, the secondary rotor will be driven forward while turning the valve one-half a revolution from the position of Figure 6 will cause the secondary rotor to move in reverse. If the valve be set as shown in Figure 9, the port 43 and both passages 79 will be blocked and the liquid cannot circulate but will be held back of the plungers 25 which will be thereby locked to the flange 37 and the secondary rotor will be driven directly from and with the primary rotor.

When the control rod or slide is pushed in and the plungers projected, the inward movement of the rod is halted when the triggers 84 rest on the rib 74, the triggers 28 then resting on the head 22 and all the detents being held in the inoperative position. The projecting plungers will ride on the eccentric surfaces of the casing and will be caused thereby to move in and out. The primary rotor will thus effect a pumping of the fluid to the secondary rotor to build up pressure against the plungers therein which will gradually overcome the inertia of the secondary rotor and gently set it in motion. As the secondary rotor acquires momentum, the controlling rod may be pushed in to the limit of its movement, whereupon the triggers 84 will drop behind the rib 74 but the triggers 28 will remain upon the head 22, it being noted that the head 22 is about twice as long as the rib 74. The plungers 25 will then remain projected but as the plungers 84 move inwardly, through engagement with the high part of the cam surface, they will be engaged by cooperating detents and held retracted, and the effort of the cam surface and the rotor to compress the liquid will serve to maintain the motion and speed of the secondary rotor with minimum strain upon the prime motor.

Having thus described the invention, I claim:

1. A hydraulic transmission including primary and secondary rotors, plungers mounted in the rotors to slide radially therein, means for holding the plungers retracted, and a controlling slide arranged to release said holding means upon a partial movement and upon further movement to maintain released position of the holding means in the primary rotor and set the holding means in the secondary rotor in operative position.

2. A hydraulic transmission including primary and secondary rotors, plungers therein, detents in the rotor to hold the plungers retracted, triggers acting upon the respective detents to release them and hold them in released position, and a slide acting upon all triggers and adapted upon partial movement to set the triggers in both rotors in detent-released position and upon further movement to set the triggers in the secondary rotor in detent-engaged position and retain the triggers in the primary rotor in detent-released position.

3. A hydraulic transmission comprising primary and secondary rotors, radially movable plungers therein, stems extending inwardly from the rotors, triggers mounted in the stems and relatively slidable, yieldable means pressing the triggers constantly inward, detents in the rotors engaging the stems and triggers to hold the plungers retracted, a slide mounted axially in the rotors, a fixed head on the slide engaging the inner ends of the triggers in the primary rotor whereby to set the triggers to release or hold the plungers upon movement of the slide, and a head mounted on the inner end of the slide and having a rib engaging the triggers in the secondary rotor whereby upon inward movement of the slide triggers in both rotors will release the plungers and upon further movement of the slide inward the triggers in the secondary rotor will drop behind the rib and the triggers in the primary rotor will be retained in plunger-releasing position.

4. A hydraulic transmission including a casing provided in one end with an inlet port and an outlet port, a tank on the casing in communication with said ports, a primary rotor in the casing, a secondary rotor in the casing having an annular lateral flange surrounding the primary rotor in eccentric spaced relation thereto, the casing having an annular channel around said flange and the flange having openings therethrough establishing communication between said channel and the space between the flange and the primary rotor, the casing further having passages leading from said channel and around the second rotor to the outlet port, a valve in said passages controlling the circulation of fluid, the rotors having passages extending axially therein from the inlet port and opening through the periphery of the primary rotor into the eccentric space around the same, and check valves in said passages preventing return flow from said eccentric space.

FRANKLIN E. STAATS.